United States Patent
Yun

(10) Patent No.: US 11,188,077 B2
(45) Date of Patent: Nov. 30, 2021

(54) APPARATUS AND METHOD FOR CONTROLLING DRIVING OF VEHICLE

(71) Applicants: HYUNDAI MOTOR COMPANY, Seoul (KR); KIA MOTORS CORPORATION, Seoul (KR)

(72) Inventor: Hyun Chul Yun, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 373 days.

(21) Appl. No.: 16/511,597

(22) Filed: Jul. 15, 2019

(65) Prior Publication Data
US 2020/0341465 A1 Oct. 29, 2020

(30) Foreign Application Priority Data
Apr. 24, 2019 (KR) .................. 10-2019-0047821

(51) Int. Cl.
*G05D 1/00* (2006.01)
*B60W 50/14* (2020.01)
*B60W 50/00* (2006.01)

(52) U.S. Cl.
CPC .......... *G05D 1/0061* (2013.01); *B60W 50/14* (2013.01); *G05D 1/0088* (2013.01); *B60W 2050/0071* (2013.01); *B60W 2050/0095* (2013.01); *B60W 2050/146* (2013.01); *B60W 2556/00* (2020.02)

(58) Field of Classification Search
CPC .. G05D 1/0061; G05D 1/0088; G05D 1/0285; B60W 50/14; B60W 2556/00; B60W 2050/0095; B60W 2050/146; B60W 2050/0071; B60W 30/14; B60W 50/082; B60Y 2300/14
See application file for complete search history.

(56) References Cited

U.S. PATENT DOCUMENTS

| | | | |
|---|---|---|---|
| 10,671,068 B1 * | 6/2020 | Xu | G06N 5/04 |
| 10,717,448 B1 * | 7/2020 | Seo | H04W 4/44 |
| 10,732,627 B1 * | 8/2020 | Roberson | B60W 50/0098 |
| 10,782,695 B1 * | 9/2020 | Ferguson | B60W 30/18154 |
| 10,915,100 B2 * | 2/2021 | Matsushita | G05D 1/0061 |
| 2007/0198145 A1 * | 8/2007 | Norris | B62D 1/286 701/23 |
| 2020/0079393 A1 * | 3/2020 | Hasegawa | G05D 1/0061 |

* cited by examiner

*Primary Examiner* — Richard M Camby
(74) *Attorney, Agent, or Firm* — Morgan, Lewis & Bockius LLP

(57) ABSTRACT

An apparatus for controlling driving of a vehicle includes a communicator that receives autonomous driving data of another vehicle, a sensor that obtains surrounding environment information and manual driving data of a subject vehicle, and a controller that obtains autonomous driving data of the subject vehicle based on the surrounding environment information and determines whether to switch to autonomous driving of the subject vehicle based on the autonomous driving data and manual driving data of the subject vehicle and the autonomous driving data of the another vehicle.

20 Claims, 5 Drawing Sheets

APPARATUS AND METHOD FOR CONTROLLING DRIVING OF VEHICLE

CROSS-REFERENCE TO RELATED APPLICATION

This application claims the benefit of priority to Korean Patent Application No. 10-2019-0047821, filed on Apr. 24, 2019 in the Korean Intellectual Property Office, the entire contents of which are incorporated herein by reference.

TECHNICAL FIELD

The present disclosure relates to an apparatus and a method for controlling driving of a vehicle.

BACKGROUND

Recently, a vehicle which is autonomously driven without requiring a driver to drive a vehicle, that is, an autonomous vehicle has been developed. The autonomous vehicle may be classified as a vehicle having an autonomous driving level from 0 to 5. Generally, the autonomous vehicle having an autonomous driving level of 3 or 4 may recognize traffic signals and road traffic, so that the autonomous vehicle may reduce the driver's intervention, but it is not enough to exclude all the driver's intervention. Thus, the autonomous vehicle allows the intervention of a driver for some functions.

Meanwhile, when the intervention of a driver is allowed, the autonomous vehicles must determine the driving state of the driver to secure the driving stability of the vehicle, and determine whether to keep the intervention of the driver based on the driving state. Therefore, there is a need to provide a technique for carefully determining the driving state according to the intervention of the driver.

SUMMARY

The present disclosure has been made to solve the above-mentioned problems occurring in the prior art while advantages achieved by the prior art are maintained intact.

According to an aspect of the present disclosure, an apparatus and a method for controlling driving of a vehicle can determine whether to maintain the driving according to the intervention of a driver by carefully determining the driving state of the driver when an intervention of the driver occurs in an autonomous vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling driving of a vehicle includes a communicator that receives autonomous driving data of another vehicle, a sensor that obtains surrounding environment information and manual driving data of a subject vehicle, and a controller that obtains autonomous driving data of the subject vehicle based on the surrounding environment information and determines whether to switch to autonomous driving of the subject vehicle based on the autonomous driving data and manual driving data of the subject vehicle and the autonomous driving data of the another vehicle.

The autonomous driving data of the another vehicle may include autonomous driving data of a nearby vehicle obtained from the nearby vehicle around the subject vehicle, and server data obtained from a server.

The server data may include autonomous driving data of a vehicle having history of driving a section in which the subject vehicle is travelling.

The controller may calculate an error value by comparing the manual driving data of the subject vehicle with the autonomous driving data of the another vehicle or the manual driving data of the subject vehicle with the autonomous driving data of the subject vehicle in order to determine whether to switch to the autonomous driving of the subject vehicle.

The controller may compare the autonomous driving data of the subject vehicle with the manual driving data of the subject vehicle to calculate a first error value.

The controller may compare the autonomous driving data of the nearby vehicle with the manual driving data of the subject vehicle to calculate a second error value.

The controller may compare the server data with the manual driving data of the subject vehicle to calculate a third error value.

The controller may control a manual driving state to be maintained when any one of the first to third error values does not exceed a reference value.

The controller may control a notification or a warning of informing of a manual driving state of the subject vehicle is an abnormal state when at least one of the first to third error values exceeds a reference value.

The controller may determine to switch to the autonomous driving when at least two of the first to third error values exceed a reference value.

According to another aspect of the present disclosure, a method of controlling driving of a vehicle includes obtaining surrounding environment information from a sensor and manual driving data of a subject vehicle from the sensor, obtaining autonomous driving data of another vehicle, obtaining autonomous driving data of the subject vehicle based on the surrounding environment information, and determining whether to switch to autonomous driving of the subject vehicle based on the autonomous driving data of the subject vehicle, the autonomous driving data of the another vehicle, and the manual driving data of the subject vehicle.

The obtaining autonomous driving data of another vehicle may include obtaining autonomous driving data of a nearby vehicle from the nearby vehicle around the subject vehicle, and obtaining server data from a server.

The server data may include autonomous driving data of a vehicle having history of driving a section in which the subject vehicle is travelling.

The determining whether to switch to the autonomous driving of the subject vehicle may include calculating an error value by comparing the manual driving data of the subject vehicle with the autonomous driving data of the another vehicle or the manual driving data of the subject vehicle with the autonomous driving data of the subject vehicle.

The calculating an error value may include calculating a first error value by comparing the autonomous driving data of the subject vehicle with the manual driving data of the subject vehicle.

The calculating an error value may include calculating a second error value by comparing the autonomous driving data of the nearby vehicle with the manual driving data of the subject vehicle.

The calculating an error value may include calculating a third error value by comparing the server data with the manual driving data of the subject vehicle.

The method may further include controlling a manual driving state to be maintained when any one of the first to third error values does not exceed a reference value.

The method may further include controlling a notification or a warning of informing of a manual driving state of the subject vehicle is an abnormal state when at least one of the first to third error values exceeds a reference value.

The method may further include controlling to switch to the autonomous driving when at least two of the first to third error values exceed a reference value.

BRIEF DESCRIPTION OF THE DRAWINGS

The above and other objects, features and advantages of the present disclosure will be more apparent from the following detailed description taken in conjunction with the accompanying drawings.

Figure 1:
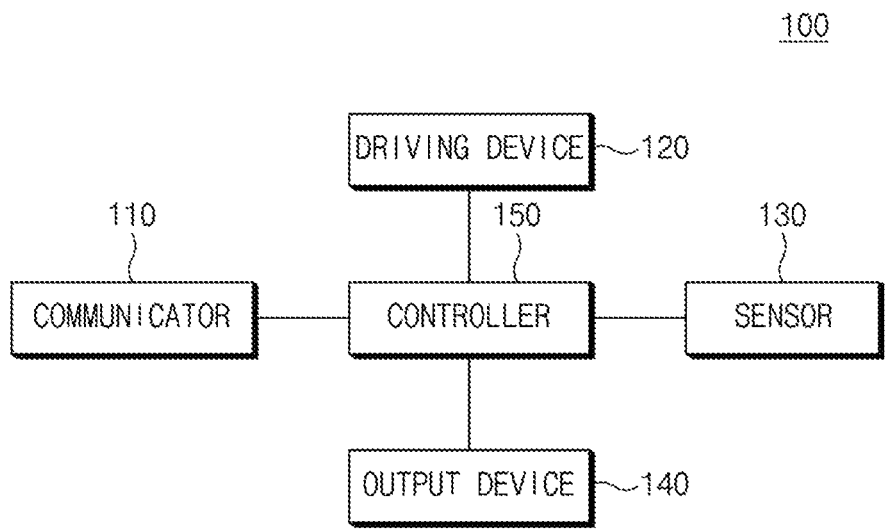
FIG. 1 is a block diagram illustrating a vehicle control apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including but not limited to, for example, specific dimensions, orientations, locations, and shapes will be determined in part by the particularly intended application and use environment.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing exemplary embodiments of the present disclosure, a detailed description of well-known features or functions will be ruled out in order not to unnecessarily obscure the gist of the present disclosure.

In describing the components in the exemplary embodiments of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a vehicle control apparatus according to an exemplary embodiment of the present disclosure.

As illustrated in FIG. 1, a vehicle control apparatus 100 according to an exemplary embodiment of the present disclosure may include a communicator 110, a driving device 120, a sensor 130, an output device 140, and a controller 150.

The communicator 110 may be a hardware device implemented by various electronic circuits to transmit and receive signals via, e.g., wireless connections. The communicator 110 may communicate with a nearby vehicle and a server 300. For example, the communicator 110 may perform vehicle-to-vehicle (V2V) communication with the nearby vehicle and vehicle-to-everything (V2X) communication with the server 300. In addition, the communicator 110 may receive autonomous driving data of another vehicle from the nearby vehicle and the server 300 through the V2V or V2X communication. In this case, the autonomous driving data of the another vehicle may include autonomous driving data of the nearby vehicle obtained from the nearby vehicle autonomously driving around a subject vehicle and server data obtained from the server 300. In addition, the server data may include an average value of autonomous driving data of a vehicle having the history of driving a section where the subject vehicle is travelling.

The controller 150 of the apparatus according to an exemplary embodiment of the present disclosure may be a processor (e.g., computer, microprocessor, CPU, ASIC, circuitry, logic circuits etc.). The controller 150 may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The driving device 120 may operate various devices of a vehicle corresponding to a driver operation or control of a controller. According to an exemplary embodiment of the present disclosure, the driving device 120 may include a steering driving device and a brake driving device. The steering driving device may control the driving direction by operating the steering device in the vehicle. For example, the steering driving device may generate a steering force and a steering angle based on a steering torque applied by a driver to a steering to control the traveling direction. The steering driving device may generate an appropriate steering force based on a control signal provided by the controller even in a situation where the steering torque applied to the wheel is not sensed. The brake driving device may reduce a vehicle speed by operating a brake in the vehicle. For example, it is possible to adjust the traveling direction of the vehicle to the left or right by differently operating the brakes respectively arranged on the left wheel and the right wheel of the vehicle.

The sensor 130 may obtain the surrounding environment information of the vehicle and manual driving data of the vehicle. For example, the sensor 130 may include at least one camera for photographing the surrounding environment of the vehicle, an ultrasonic sensor, an infrared sensor, a radar, a lidar, and the like and obtain the surrounding environment information of the vehicle by using them. In addition, the sensor 130 may include a steering sensor, a speed sensor, and the like which are used to sense the steering angle, the steering force, the speed, and the like generated from the driving device 120 by the driver's operation, so that the sensor 130 may obtain the manual driving data of the vehicle. That is, the manual driving data of the vehicle may include the steering angle, the steering force, the speed, and the like sensed by the sensor 130.

The output device 140 may output visually or audibly information processed by the controller 150. To this end, the output device 140 may be implemented as a display device or a sound output device. According to an exemplary embodiment of the present disclosure, the display device may be provided in a cluster, a dashboard, a center fascia, a console box, or the like, and may be implemented as a display part of a navigation device, a HUD, a cluster, or the like. In addition, the display device may be implemented with a display device employing a liquid crystal display (LCD) panel, a light emitting diode (LED) panel, an organic light emitting diode (OLED) panel, or a plasma display panel (PDP), and the like. The liquid crystal display may include a thin film transistor liquid crystal display (TFT-LCD).

The controller 150 may control the overall operation of the vehicle driving control apparatus according to an exemplary embodiment of the present disclosure and may be implemented with a microprocessor or the like in which a semiconductor chip or the like capable of operating or executing various instructions is embedded.

The controller 150 may compare the manual driving data of the vehicle obtained through the sensor 130 with the autonomous driving data of the subject vehicle and the autonomous driving data of another vehicle to determine whether to maintain the manual driving state or switch to the autonomous driving. In addition, the controller 150 may control to output the determination result through the output device 140. In addition, when the controller 150 determines that it is not enough to switch to autonomous driving, the controller 150 may control to notify or warn the driver that the manual driving state is abnormal.

To this end, the controller 150 may generate a control signal of the driving device 120 for the acceleration, deceleration, and directional change of the vehicle based on the surrounding environment information obtained by at least one of the camera, the ultrasonic sensor, the infrared sensor, the radar, and the lidar, and may obtain the generated control signal as the autonomous driving data of the vehicle. According to an exemplary embodiment of the present disclosure, the controller 150 may generate the control signal of the driving device 120 for the case of switching to the autonomous driving mode even when the driving device 120 is operated by the driver operation. That is, the controller 150 may generate the control signal of the driving device 120 even when the vehicle is driven by the driver operation, such that the mode switching may be performed in real time when the driver switches the manual driving mode to the autonomous driving mode. Accordingly, the controller 150 may obtain the autonomous driving data in real time even when the vehicle is in the manual driving state.

In addition, the controller 150 may obtain the autonomous driving data of another vehicle. In this case, the autonomous driving data of another vehicle may include autonomous driving data of a nearby vehicle obtained from the nearby vehicle that is autonomously driven around the subject vehicle, and server data obtained from the server 300. In this case, the server data may include an average value of the autonomous driving data of the vehicle having the history of driving in the section in which the subject vehicle is travelling.

The controller 150 may calculate an error value by comparing the autonomous driving data of the vehicle, the autonomous driving data of another vehicle, and the manual driving data of the vehicle obtained as described above. Hereinafter, a scheme of calculating the error value by comparing the respective data will be described in detail.

According to an exemplary embodiment, the controller 150 may compare the manual driving data of the vehicle and the autonomous driving data of the vehicle, and calculate the first error value. In this case, the first error value may be calculated as a different value for each driving device 120, and may be calculated as an absolute value of the difference between the sensing value for the operation of the driving device 120 during manual driving and the control value for the operation of the driving device 120 during autonomous driving. For example, the first error value may mean at least one of an error value of the steering driving device or an error value of the brake driving device.

Referring to Table 1, the controller 150 may calculate the error value of the manual driving data and the autonomous driving data of the steering driving device as '0.9', and calculate the error value of the manual driving data and the autonomous driving data of the brake driving device as '0.5'. The controller 150 may set a tolerant deviation as a reference value and compare the error value with the reference value to determine that the error values of the steering driving device and the brake driving device do not exceed the reference value.

TABLE 1

| Classification | | Sensing value | | | | | |
|---|---|---|---|---|---|---|---|
| | | Manual driving of subject vehicle | | Autonomous driving of subject vehicle | | Reference value (tolerant deviation) | |
| Steering driving device | Steering | Left | 3 | Left | 3.9 | Left | ±1 |
| | | Right | — | Right | — | Right | |
| Brake driving device | Brake pedal | Deceleration | 5 | Deceleration | 5.5 | Deceleration | ±2 |
| | | Acceleration | disable | Acceleration | disable | Intolerance | |

The controller 150 may compare the manual driving data of the vehicle and the autonomous driving data of the nearby vehicle, and calculate the second error value. In this case, the autonomous driving data of the nearby vehicle may mean an average value of the autonomous driving data received from at least two or more nearby vehicles which are travelling around the subject vehicle. The second error value may be calculated as an absolute value of the difference between the sensing value for the operation of the driving device 120 during manual driving and the control value for the operation of the driving device 120 during autonomous driving of the nearby vehicle. For example, the second error value may mean at least one of an error value of the steering driving device or an error value of the brake driving device.

Referring to Table 2, the controller 150 may calculate the error value of the manual driving data of the steering driving device and the autonomous driving data of the nearby vehicle as '1.1', and calculate the manual driving data of the brake driving device and the autonomous driving data of the nearby vehicle as '2.5'. The controller 150 may compare the error values with the reference value (tolerant deviation) and may determine that the error values of the steering driving device and the brake driving device exceed the reference value.

TABLE 2

| Classification | | Manual driving of subject vehicle | | Autonomous driving of nearby vehicle | | Tolerant deviation | |
|---|---|---|---|---|---|---|---|
| Steering driving device | Steering | Left | 3 | Left | 4.1 | Left | ±1 |
| | | Right | — | Right | — | Right | |
| Brake driving device | Brake pedal | Deceleration | 5 | Deceleration | 7.5 | Deceleration | ±2 |
| | | Acceleration | disable | Acceleration | disable | Intolerance | |

The controller 150 may compare the manual driving data of the vehicle and the server data, and calculate the third error value. In this case, the server data may mean an average value of the autonomous driving data of a vehicle having the history of driving in a section in which the subject vehicle is travelling. The third error value may be calculated as an absolute value of the difference between the sensing value of the driving device during manual driving and the control value for the operation of the driving device during autonomous driving, which is received from the server 300. For example, the third error value may mean at least one of an error value of the steering driving device or an error value of the brake driving device.

Referring to Table 3, the controller 150 may calculate the error value of the manual driving data of the steering driving device and the server data as '1.15', and calculate the error value of the manual driving data of the brake driving device and the server data as '1'. The controller 150 may compare the error value with the reference value (tolerant deviation) and may determine that the error value of the steering driving device exceeds the reference value and the error value of the brake driving device does not exceed the reference value.

TABLE 3

| Classification | | Manual driving of subject vehicle | | Autonomous driving of nearby vehicle | | Tolerant deviation | |
|---|---|---|---|---|---|---|---|
| Steering driving device | Steering | Left | 3 | Left | 4.15 | Left | ±1 |
| | | Right | — | Right | — | Right | |
| Brake driving device | Brake pedal | Deceleration | 5 | Deceleration | 6 | Deceleration | ±2 |
| | | Acceleration | disable | Acceleration | Disable | Intolerance | |

When it is determined that any one of the calculated first to third error values does not exceed the reference value, the controller 150 may control to maintain the driving of a driver, that is, the manual driving state.

In addition, when at least one of the calculated first to third error values exceeds the reference value, the controller 150 may control to output that the driving state of the driver is abnormal. For example, when at least one of the first to third error values exceeds the reference value, the controller 150 may determine that the steering of the vehicle is not controlled in a normal state and may output a notification or warning of guiding the abnormal control state such that the steering of the vehicle is controlled in the normal state. As another example, when at least one of the first to third error values exceeds the reference value, the controller 150 may determine that the vehicle driving speed is not controlled at the normal speed and may output a notification or warning of guiding the abnormal control state such that the vehicle speed is controlled in the normal state.

In addition, when two or more error values of the calculated first to third error values exceed the reference value, the controller 150 may output a notification or warning of guiding forcibly switching to autonomous driving and may control the vehicle to switch to the autonomous driving.

Meanwhile, after the notification or warning of guiding the abnormal control state is output, the controller 150 may recalculate the first to third values to determine whether the manual driving state of the driver is changed in response to the notification or warning. In addition, when it is determined that any one of the recalculated first to third error values is less than the reference value, the controller 150 may release the notification or warning of the abnormal control state. However, the history of outputting the notification or warning may be stored.

Further, after the notification or the warning of guiding the abnormal control state is outputted, when it is determined that two or more error values of the recalculated first to third error values exceed the reference value, the controller 150 may control to forcibly switch from the driver manual driving state to the autonomous driving mode. Thereafter, the state of the driver is identified through a remote diagnosis or service center, and when the result of determining that the state of the driver is normal is received, it is possible to cancel the forced switching to the autonomous driving.

In addition, after the notification or warning of guiding forcibly switching to the autonomous driving is output, the controller 150 may identify the state of the driver through the remote diagnosis or service center and may determine whether the driver desires to switch to the manual driving mode again based on the state of the driver. According to an exemplary embodiment, when the controller 150 receives the result of determining that the driver status is normal through the remote diagnosis or service center, the controller 150 may cancel the forcible switching to autonomous driving.

Figure 2:
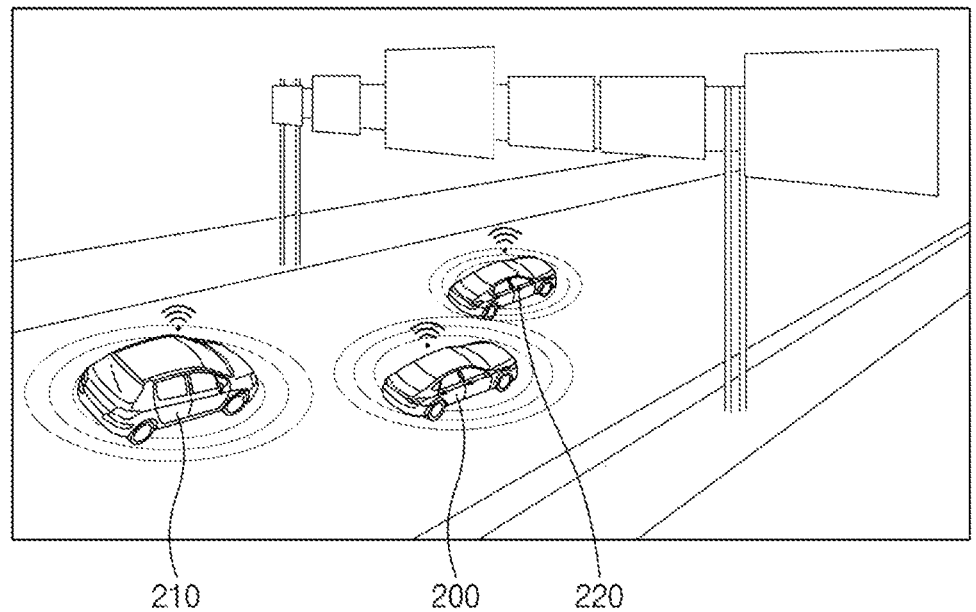
FIG. 2 is a view illustrating V2V communication according to an exemplary embodiment of the present disclosure.
Figure 3:
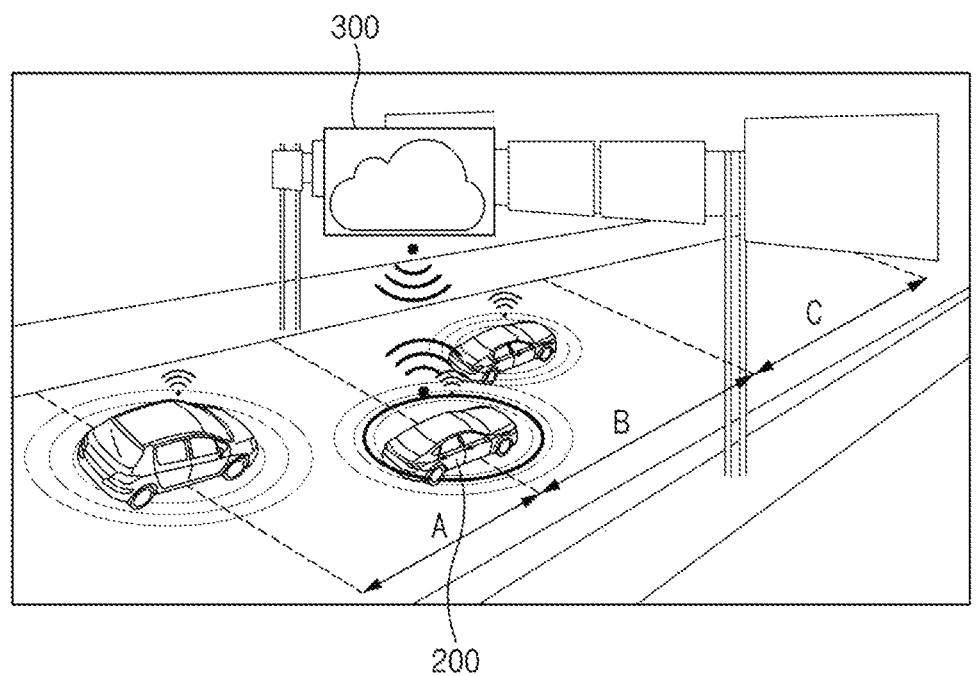
FIG. 3 is a view illustrating server communication according to an exemplary embodiment of the present disclosure.

FIG. 2 is a view illustrating V2V communication according to an exemplary embodiment of the present disclosure. FIG. 3 is a view illustrating server communication according to an exemplary embodiment of the present disclosure.

As illustrated in FIG. 2, a subject vehicle 200 may communicate in V2V communication scheme with nearby vehicles 210 and 220 which are autonomously driven around the subject vehicle 200. In this case, the subject vehicle 200 may be in the manual driving state and the nearby vehicles 210 and 220 may be in the autonomous driving state. According to an exemplary embodiment, each of the nearby vehicles 210 and 220 may generate the control signal of the driving device 120 for acceleration, deceleration, and redirection thereof based on surrounding environment information obtained by at least one of a camera, an ultrasonic sensor, an infrared sensor, radar, a lidar, and the like, and may be autonomously driven based on the generated control signal. In addition, the nearby vehicles 210 and 220 may transmit the control value for each driving device 120, which is calculated based on the control signal, to the subject vehicle 200 through the V2V communication.

FIG. 3 is a view illustrating server communication according to an exemplary embodiment of the present disclosure.

As illustrated in FIG. 3, the subject vehicle 200 may communicate with a server 300 through the V2X communication. The server 300 may receive the autonomous driving data of the vehicle having the history of driving in the section where the subject vehicle 200 is traveling and may transmit the autonomous driving data to the subject vehicle 200. In more detail, the server 300 may divide the section, in which the subject vehicle 200 is currently traveling, into a plurality of sections based on a precise map, and may receive autonomous driving data from autonomous vehicles having driving history in the plurality of section. For example, as illustrated in FIG. 3, the section where the subject vehicle 200 is travelling may be divided into a plurality of sections 'A', 'B', and 'C', and autonomous driving data in each section may be received.

Figure 4:
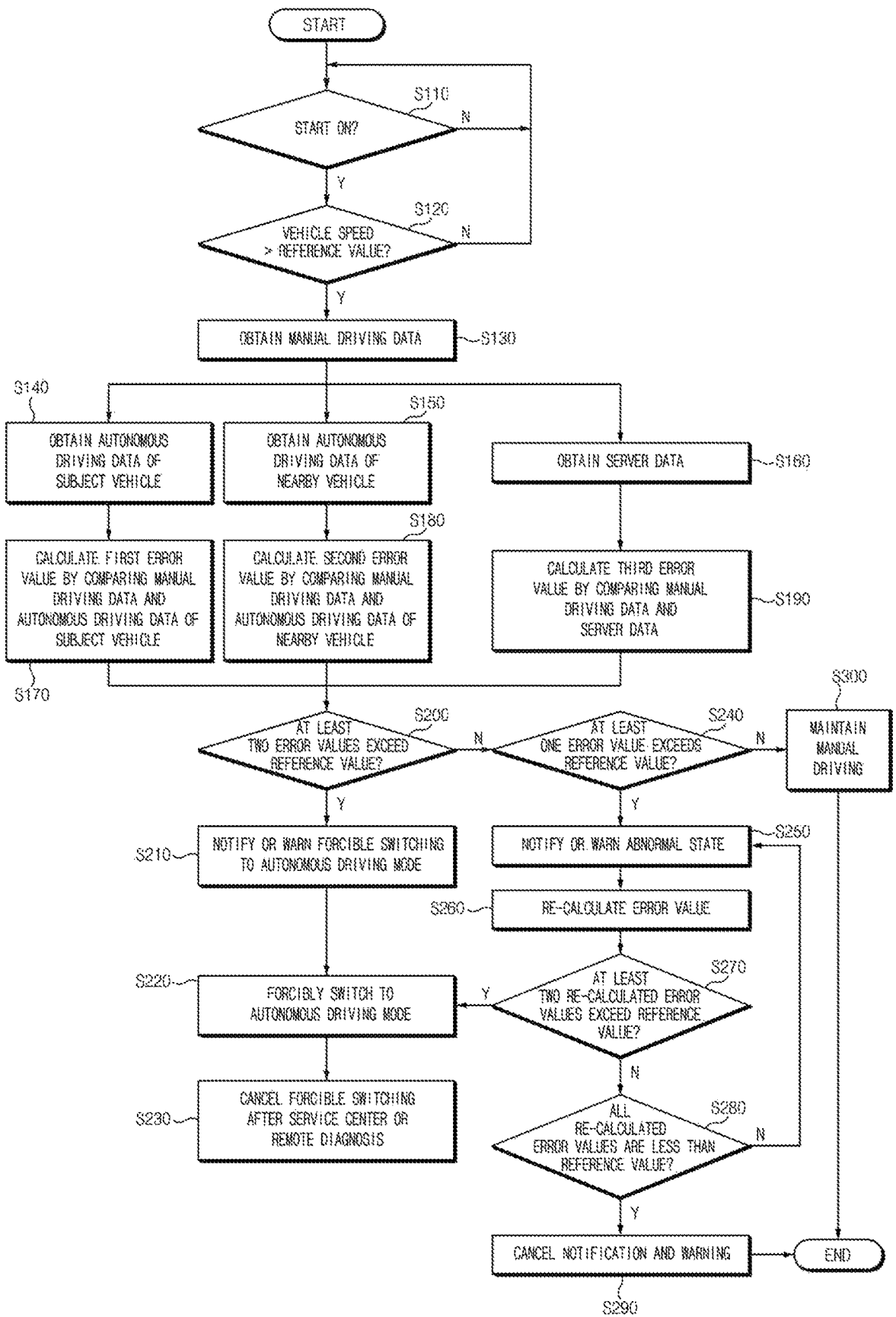
FIG. 4 is a flowchart illustrating a method of controlling driving of a vehicle according to an exemplary embodiment of the present disclosure.

FIG. 4 is a flowchart illustrating a method of controlling driving of a vehicle according to an exemplary embodiment of the present disclosure.

As illustrated in FIG. 4, in S110, the controller 150 determines whether the vehicle is in a start-on state. In S120, when the vehicle is in the start-on state, it is determined whether the vehicle speed exceeds the reference speed. When it is determined in S110, that the vehicle is not in the start-on state, that is, is in a start-off state (N), the controller 150 re-determines whether the vehicle is in the start-on state.

When it is determined in S120 that the vehicle speed exceeds the reference speed (Y), the controller 150 obtains the manual driving data of the vehicle in S130. When it is determined in S120 that the vehicle speed does not exceed the reference speed (N), the controller 150 re-determines whether the vehicle is in the start-on state.

In S130, the controller 150 may obtain the manual driving data from the sensor 130 that senses the operation values (a steering angle, a steering force, a speed, and the like) generated from the driving device 120 by the operation of the driver.

The controller 150 obtains the autonomous driving data of the subject vehicle in S140. In S140, the controller 150 may generate a control signal of the driving device 120 for the acceleration, deceleration, directional change, and the like of the vehicle based on the surrounding environment information obtained by at least one of the camera, the ultrasonic sensor, the infrared sensor, the radar, and the lidar, and may obtain the generated control signal as the autonomous driving data of the vehicle.

The controller 150 obtains the autonomous driving data of the nearby vehicle in S150. In S150, the controller 150 may obtain the autonomous driving data of the nearby vehicle through the V2V communication from the nearby vehicle which is autonomously travelling around the subject vehicle.

The controller 150 obtains the server data in S160. In S160, the controller 150 may obtain the autonomous driving data from the vehicle having the history of driving in the section, in which the subject vehicle is travelling, through the V2X communication from the server 300. For example, in S160, the controller 150 may divide the section, in which the subject vehicle is currently traveling, into a plurality of sections based on the precise map, and may obtain the autonomous driving data from autonomous vehicles having driving history in the plurality of sections.

The controller 150 compares the manual driving data obtained in S130 and the autonomous driving data obtained in S140, and calculates the first error value in S170. The first error value calculated in S170 may be calculated for each driving device 120, and for example, may be calculated for each of the steering driving device and the brake driving device. In step S170, the controller 150 may calculate, as the first error value, the absolute value of the difference between the sensing value for the operation of the driving device during manual driving and the control value for the operation of the driving device during autonomous driving.

In S180, the controller 150 compares the manual driving data obtained in S130 and the autonomous driving data of the nearby vehicle obtained in S150 to calculate the second error value. The second error value calculated in S180 may be calculated for each driving device 120, and for example, may be calculated for each of the steering driving device and the brake driving device. In S180, the controller 150 may calculate the absolute value of the difference between the sensing value for the operation of the driving device 120 during manual driving and the control value for the operation of the driving device 120 during autonomous driving of the nearby vehicle.

In S190, the controller 150 compares the manual driving data obtained in S130 and the server data obtained in S160 to calculate the third error value. The third error value calculated in S190 may be calculated for each driving device, and for example, may be calculated for each of the steering driving device and the brake driving device. In S190, the controller 150 may calculate the absolute value of the difference between the sensing value for the operation of the driving device during manual driving and the control value for the operation of the driving device during autonomous driving received from the server.

In S200, the controller 150 compares the first to third error values calculated in S170, S180, and S190 with the reference value to determine whether at least two of the first to third error values exceed the reference value. In this case, the reference value, which means an error tolerant deviation, may be set differently for each driving device 120.

When it is determined in S200 that at least two error values exceed the reference value (Y), the controller 150 outputs the notification or warning of guiding the forcible switching from the manual driving state to the autonomous driving mode in S210. Thereafter, the controller 150 forcibly switches to the autonomous driving mode in S220. After switching to the autonomous driving mode in S220, in S230, the controller 150 determines the manual driving state of the driver through a service center or remote diagnosis, and cancels the forcible switching to the autonomous driving mode when the manual driving state of the driver is normal.

Meanwhile, when it is determined in S200 that at least two error values do not exceed the reference value (N), the controller 150 determines whether at least one of the first to third error values exceeds the reference value in S240.

In step S240, when it is determined in S240 that at least one error value exceeds the reference value (Y), the controller 150 outputs a notification or warning of notifying that the manual driving state of the driver is abnormal in S250. Meanwhile, when it is determined in S240 that any one error value does not exceed the reference value (N), the controller 150 maintains the manual driving state of the driver in S300.

After S250, in S260, the controller 150 re-calculates the first to third error values to determine whether the manual driving state of the driver is changed in response to the notification or warning output in S250. In S260, the controller 150 may repeat the operations of S130 to S190 to re-calculate the first to third error values.

In S270, the controller 150 determines whether at least two error values recalculated in S260 exceed the reference value. When it is determined in S270 that at least two re-calculated error values exceed the reference value (Y), the controller 150 forcibly switches from the manual driving of the driver to the autonomous driving mode in S220. Meanwhile, when it is determined in S270 that at least two re-calculated error values do not exceed the reference value (N), in S280, the controller 150 determines whether all re-calculated error values are less than the reference value.

When all the re-calculated error values are less than the reference value (Y), in S290, the controller 150 cancels the notification or warning output in S250. Meanwhile, when it is determined in S280 that all the re-calculated error values are not less than the reference value, in S250, the controller 150 outputs the notification or warning of notifying that the manual driving state of the driver is abnormal.

Figure 5:
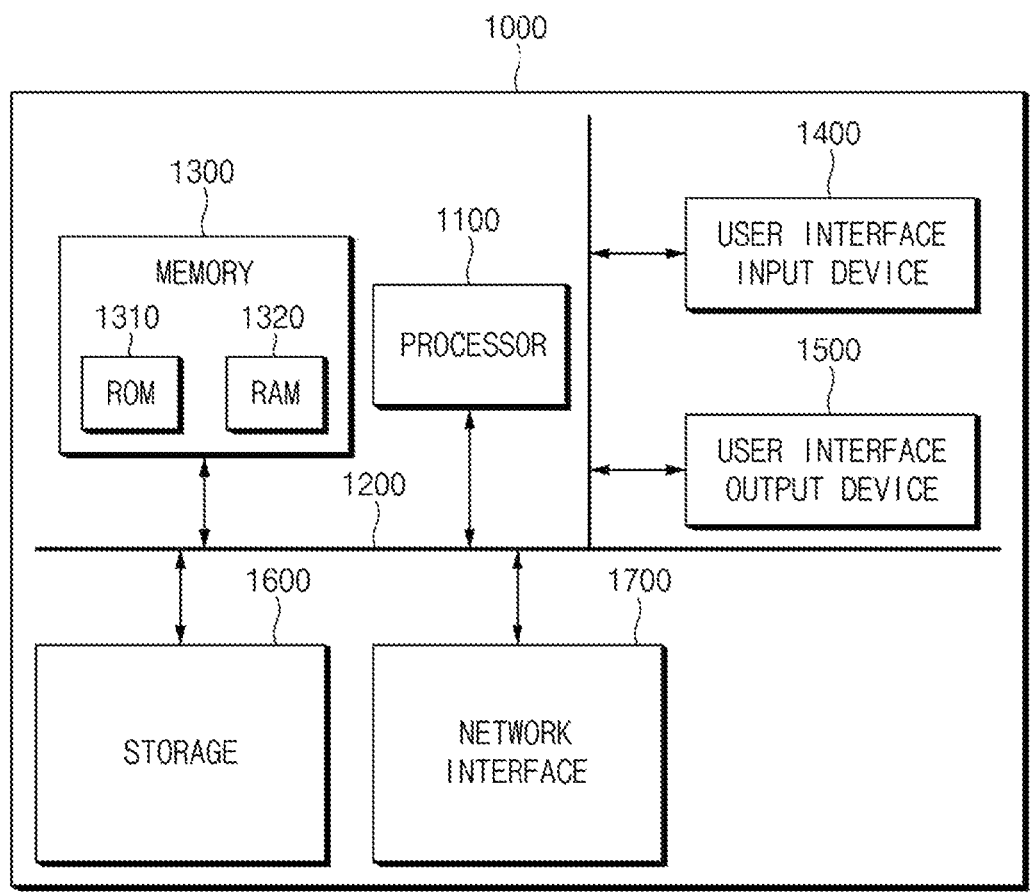
FIG. 5 is a view illustrating a computing system for executing a method according to an exemplary embodiment of the present disclosure.

FIG. 5 is a view illustrating a computing system for executing a method according to an exemplary embodiment of the present disclosure.

Referring to FIG. 5, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to an exemplary embodiment of the apparatus and the method for controlling driving of a vehicle in the present disclosure, it is possible to determine the driving state of the driver to maintain the vehicle driving according to the driver's intervention or to switch to the autonomous driving mode, thereby improving the driving stability.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling driving of a vehicle, the apparatus comprising:
    a communicator configured to receive autonomous driving data of another vehicle;
    a sensor configured to obtain surrounding environment information and manual driving data of a subject vehicle; and
    a controller configured to obtain autonomous driving data of the subject vehicle based on the surrounding environment information, and to determine whether to switch to autonomous driving of the subject vehicle based on the autonomous driving data and manual driving data of the subject vehicle and the autonomous driving data of the another vehicle.

2. The apparatus of claim 1, wherein the autonomous driving data of the another vehicle includes autonomous driving data of a nearby vehicle obtained from the nearby vehicle around the subject vehicle, and server data obtained from a server.

3. The apparatus of claim 2, wherein the server data include autonomous driving data of a vehicle having history of driving a section in which the subject vehicle is travelling.

4. The apparatus of claim 2, wherein the controller is configured to calculate an error value by comparing the manual driving data of the subject vehicle with the autonomous driving data of the another vehicle or by comparing the manual driving data of the subject vehicle with the autonomous driving data of the subject vehicle in order to determine whether to switch to the autonomous driving of the subject vehicle.

5. The apparatus of claim 4, wherein the controller is configured to compare the autonomous driving data of the subject vehicle with the manual driving data of the subject vehicle to calculate a first error value.

6. The apparatus of claim 5, wherein the controller is configured to compare the autonomous driving data of the nearby vehicle with the manual driving data of the subject vehicle to calculate a second error value.

7. The apparatus of claim 6, wherein the controller is configured to compare the server data with the manual driving data of the subject vehicle to calculate a third error value.

8. The apparatus of claim 7, wherein the controller is configured to control a manual driving state to be maintained when any one of the first to third error values does not exceed a reference value.

9. The apparatus of claim 7, wherein the controller is configured to control an output device to output a notification or a warning for informing that a manual driving state of the subject vehicle is an abnormal state when at least one of the first to third error values exceeds a reference value.

10. The apparatus of claim 7, wherein the controller is configured to determine to switch to the autonomous driving when at least two of the first to third error values exceed a reference value.

11. A method of controlling driving of a vehicle, the method comprising:
   obtaining surrounding environment information from a sensor and manual driving data of a subject vehicle from the sensor;
   obtaining autonomous driving data of another vehicle;
   obtaining autonomous driving data of the subject vehicle based on the surrounding environment information; and
   determining whether to switch to autonomous driving of the subject vehicle based on the autonomous driving data of the subject vehicle, the autonomous driving data of the another vehicle, and the manual driving data of the subject vehicle.

12. The method of claim 11, wherein the obtaining autonomous driving data of another vehicle includes:
   obtaining autonomous driving data of a nearby vehicle from the nearby vehicle around the subject vehicle; and
   obtaining server data from a server.

13. The method of claim 12, wherein the server data include autonomous driving data of a vehicle having history of driving a section in which the subject vehicle is travelling.

14. The method of claim 12, wherein the determining whether to switch to autonomous driving of the subject vehicle includes:
   calculating an error value by comparing the manual driving data of the subject vehicle with the autonomous driving data of the another vehicle or by comparing the manual driving data of the subject vehicle with the autonomous driving data of the subject vehicle.

15. The method of claim 14, wherein the calculating an error value includes calculating a first error value by comparing the autonomous driving data of the subject vehicle with the manual driving data of the subject vehicle.

16. The method of claim 15, wherein the calculating an error value includes calculating a second error value by comparing the autonomous driving data of the nearby vehicle with the manual driving data of the subject vehicle.

17. The method of claim 16, wherein the calculating an error value includes calculating a third error value by comparing the server data with the manual driving data of the subject vehicle.

18. The method of claim 17, further comprising:
   controlling a manual driving state to be maintained when any one of the first to third error values does not exceed a reference value.

19. The method of claim 17, further comprising:
   controlling a notification or a warning for informing that a manual driving state of the subject vehicle is an abnormal state when at least one of the first to third error values exceeds a reference value.

20. The method of claim 17, further comprising:
   controlling to switch to the autonomous driving when at least two of the first to third error values exceed a reference value.

* * * * *